Nov. 27, 1934.    R. S. TROTT    1,982,594

ENGINE MOUNTING FOR AUTOMOTIVE VEHICLES

Original Filed Nov. 25, 1929    3 Sheets-Sheet 1

INVENTOR.
Rolland S. Trott

Nov. 27, 1934.  R. S. TROTT  1,982,594
ENGINE MOUNTING FOR AUTOMOTIVE VEHICLES
Original Filed Nov. 25, 1929   3 Sheets-Sheet 2

INVENTOR.
Rolland S. Trott

Nov. 27, 1934.   R. S. TROTT   1,982,594
ENGINE MOUNTING FOR AUTOMOTIVE VEHICLES
Original Filed Nov. 25, 1929   3 Sheets-Sheet 3
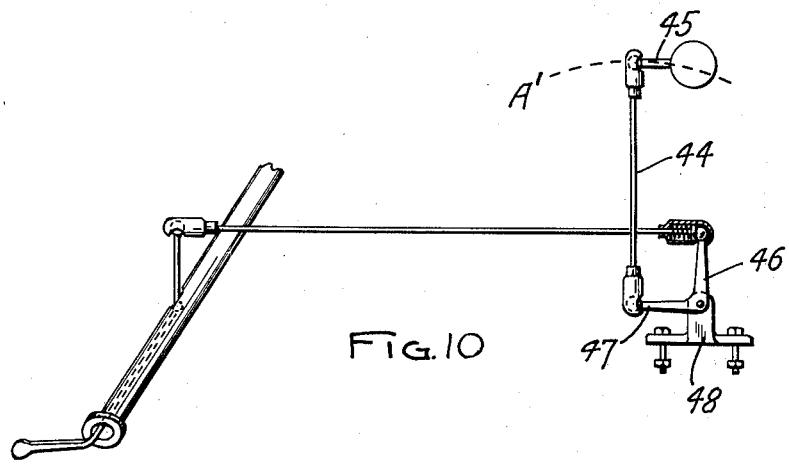
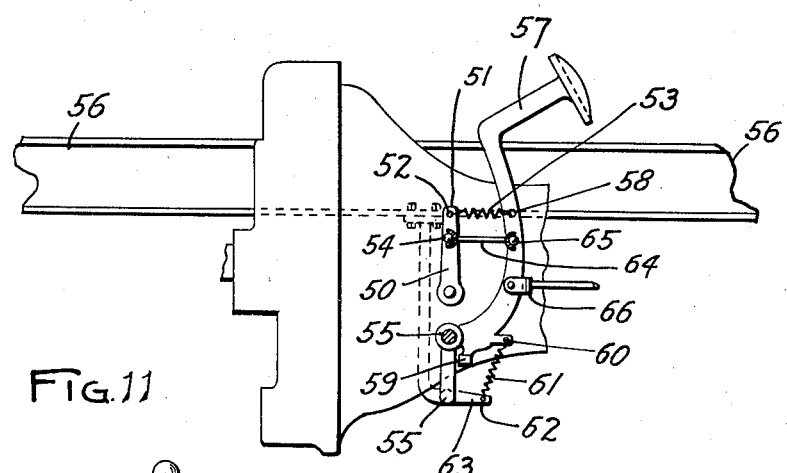
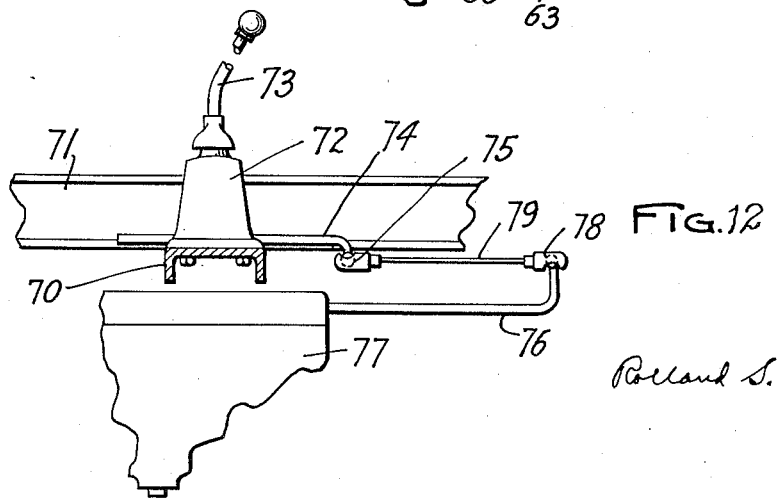
INVENTOR.
Rolland S. Trott Patented Nov. 27, 1934

1,982,594

UNITED STATES PATENT OFFICE 1,982,594

ENGINE MOUNTING FOR AUTOMOTIVE VEHICLES

Rolland S. Trott, Denver, Colo.

Continuance of original application November 25, 1929, Serial No. 409,572. This application November 10, 1932, Serial No. 642,042

41 Claims. (Cl. 180—64)

My invention relates to engine mountings for automotive vehicles and is a continuation of my application Serial No. 409,572, filed November 25, 1929, and is also an improvement over my former invention in Automotive vehicles, application for Letters Patent on which was filed November 24th, 1928, the serial number being 321,634, now Patent No. 1,890,871, granted December 13, 1932.

In my former application, Serial No. 321,634, mentioned above, the torque was entirely taken at all times by the front mounting, and when the engine was running the car, and the explosions therefore were occurring with little time interval between them, there was comparatively little engine oscillation. This I believe was due to the inertia of the mass of the engine unit combined with the too short a time interval between explosions to permit much movement of the engine mass. But, when the engine was idling, and hence running slowly, the time between the explosions was very much greater, and this extra time element resulted in an increased amplitude of oscillation for the engine unit. Although the engine would settle down and run evenly and oscillate but slightly when it was run at a higher speed, there was an increased amount of oscillation at the slower speeds.

An object of my present invention is to provide an engine mounting which under normal running conditions will transmit most of the engine torque reaction through the front mounting with less of it passing through the rear mounting, said rear mounting taking a decreased amount of torque as the amount of oscillation decreases.

Another object of my present invention is to provide an engine unit mounting and frame construction which will mount the front of the engine unit by a spring mounting carried directly upon the front axle and separate from the frame of the vehicle, and without the necessity of the use of rubber bumpers or other spring control devices between the front of the engine and the adjacent portions of the frame.

A further object is to provide an engine mounting which will mount the rear of the engine unit upon the frame substantially pivotally and by a cheap and reliable construction, which may be capable of taking some of the torque, taking more torque as the speed decreases.

A further object is to provide such an engine mounting in which the front and rear supports of the engine unit may with slight variations for different makes of vehicles, be designed to be attached to vehicles after they have been manufactured with a minimum of alteration required in the manufactured vehicle, so that the engine mounting may be made and sold as an accessory or replacement mounting.

A further object is to provide such an engine mounting which may be incorporated into the vehicle as it is being manufactured by slight alterations in the design of the vehicle, and at little, if any, additional cost.

I attain the above objects by providing a mounting for the front of the engine unit preferably including a properly cambered torque spring of proper strength and characteristics, running parallel with the front axle, shackled at its ends to shackle brackets properly spaced, which clamp upon the springs or radius or axle members, the center of the torque spring being bolted to a spring seat which in turn is bolted to the front of the engine; and by providing a substantially pivotal mounting for the rear of the engine unit, preferably including a moulded, externally grooved rubber ring, fitting about the universal joint housing or other external member or portion of the engine unit and having support means carried by the frame and supporting the rear of the engine unit through the rubber ring.

All of the above constructions are fully described below and are illustrated in the drawings, in which:—

Fig. 10 shows diagrammatically the parts of one form of spark control construction.

Fig. 11 shows diagrammatically a side view in partial section, of one form of pedal control construction.

Fig. 12 shows a side view in partial section of one form of transmission control construction.

Figure 1:
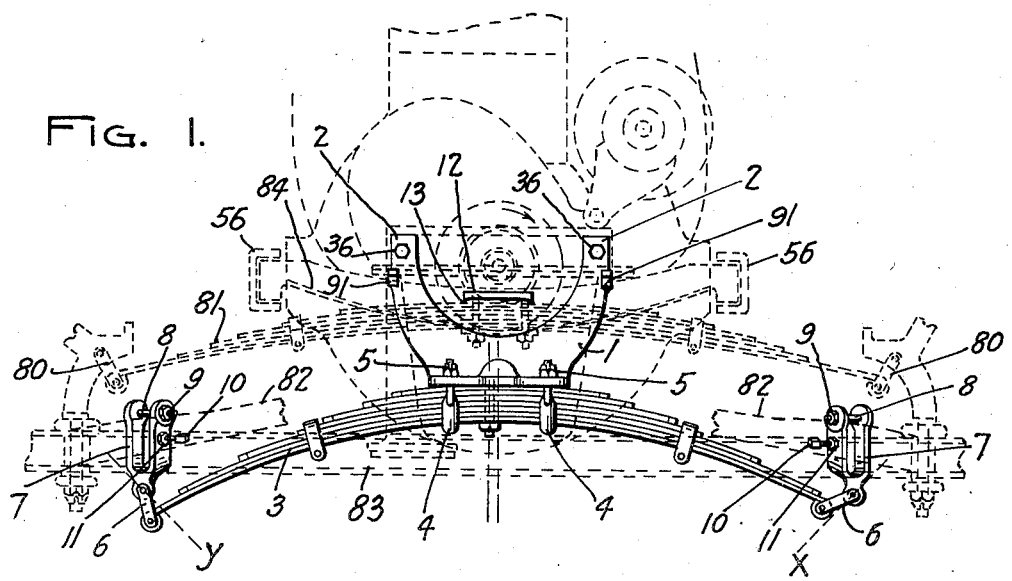
Fig. 1 is a fragmentary front elevation of one form of the front mounting construction, with the co-acting parts of the vehicle shown in dotted lines.
Figure 2:
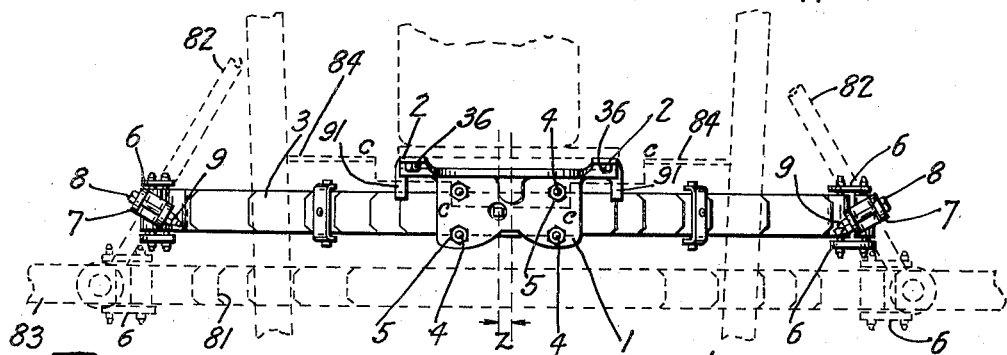
Fig. 2 is a top plan view of Fig. 1.
Figure 6:
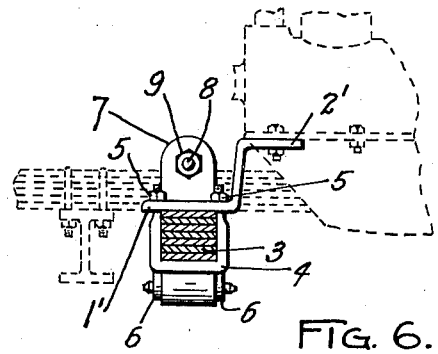
Fig. 6 is a fragmentary side elevation partly in section of a modified form of the front mounting, with some of the co-acting parts of the vehicle shown in dotted lines.

The spring seat 1, is in the form of a pedestal provided with the engine contacting portions 2, which may be vertical as shown in Figs. 1 and 2, or horizontal as shown at 2' in Fig. 6, depending upon the design and construction of the particular engine to which it is to be fitted.

Figure 7:
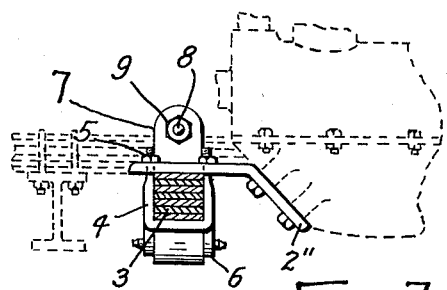
Fig. 7 is a fragmentary side elevation partly in section of another modified form of front mounting with some of the co-acting parts of the vehicle shown in dotted lines.

If required by the engine in question both horizontal and vertical engine-contacting portions may be used, or oblique portions such as shown at 2'' in Fig. 7, or vertical, horizontal and oblique portions may all be used just so long as the spring seat is properly fitted and mounted upon the engine, as anyone versed in such matters will readily perceive.

In some engines, the spring seat may be designed to replace some bolted-on portion of the manufactured engine, so as to serve a double purpose, or may be made as an integral part of the engine, but in any case, however, it is attached to the engine, and whatever other duties it may perform, the spring seat serves to mount the front end of the engine upon the torque spring 3.

The spring 3 is to be properly and securely attached to the spring seat 1 as by the U-bolts 4 and the nuts 5.

The outer ends of the spring 3 are provided with bushed eyes and receive the shackles 6 which are mounted on the shackle-brackets 7.

The shackle-brackets 7 are shown as clamped by the bolts 8 and nuts 9 to the radius members 82 of the front axle 83, in the construction shown in Figs. 1 and 2, or to the front axle springs in the construction shown in Figs. 6 and 7. The members 82 may be separate, or in a one-piece wish-bone form, and in either case may be pivotally mounted either on the engine unit or on the frame of the vehicle, both of which are well-known constructions and are not shown in the drawings.

Clamping the shackle-brackets on either the radius members or the springs, in effect, mounts the torque spring 3 directly on the front axle of the vehicle; but any other method or construction desired may be employed so long as the result is in general the same in providing a resilient mounting for the front of the engine unit directly on the front axle separate from the frame.

In any case, the shackle brackets provide a cheap, simple and practical method of mounting the torque spring 3 on the front axle of a vehicle either during the process of manufacture or after the vehicle has been manufactured.

The set-screws 10 and lock-nuts 11 are used in the brackets 7 to insure a stationary mounting of the shackle-brackets and may be eliminated if desired, and the clamp of the bracket alone relied upon for the positioning thereof. Also, should the shackle brackets be made an integral part of the axle, of course, the set-screws and lock-nuts will not be needed.

The distance between the shackle brackets should be sufficiently greater than the length of the loaded cambered torque spring 3, to give an angle to the torque spring shackles which should be in proper relation to the amount of camber of the spring and the number of its leaves and the load upon the spring, to give the vertical spring action desired for the front end of the engine.

In one certain tested construction this resulted in giving the shackles when equally angled, a normal position forty-five (45) degrees or more from the vertical line through their bracket ends, and extending inward, as indicated by the dotted lines "$x$" and "$y$" in Fig. 1.

This considerable inward angle not only prevents excessive side sway of the front end of the engine over rough roads, but also has a snubbing effect upon the action of the spring, which, when properly combined with the other factors mentioned gives the engine substantially the same vertical movements over rough roads as is given the front end of the frame by the weakened frame springs when controlled by shock absorbers, and with the shackles 80 more nearly vertical.

Change of the number of leaves or of the camber of the frame spring 81, or of the adjustment of the shock absorbers (not shown) will change the vertical movement of the frame, and these changes can be used to assist in getting substantial unison of action of the frame and the front of the engine; and change of the number of leaves and of the camber of the torque spring coupled with change in the distance between the two shackle brackets 7, with the resulting change in the inward angle of the shackles 6, may also be used, so that not only the front of the engine and the frame will move vertically in substantial unison but the amount of this movement desired may be obtained quite closely. It is thought this explanation will permit anyone well versed in such matters to make the proper combination and proportion of parts to provide all of the results desired for any particular design of vehicle.

It is found, however, that the torque of the engine when run anti-clockwise, which is the usual direction of rotation when viewed from the driver's seat, tends to raise the left end of the torque spring and depress its right end, which results in the left shackle being swung slightly toward the right to a more nearly horizontal position, and the right shackle being swung slightly to the right to a more nearly vertical position, as shown in Fig. 1.

Due to this, the torque spring is moved bodily slightly to the right, with the left end slightly raised and the right end slightly depressed, due to the radial movements of the shackles.

To maintain the engine in the center of the frame in spite of this movement of the torque spring, so that the starting crank (not shown) in case of need, can be easily inserted, the seat 1 is mounted on the spring 3 off-center to the left an amount represented as "Z" in Fig. 2, equal to the off-set to the right, of the torque spring.

Accommodation for the tilt of the spring 3, due to the above stated position assumed by the shackles, may be made in the seat 1, or in its connection to the engine, if desired, but it will generally be too small in amount to show up in the drawings very clearly, and generally can be retained without discovery by the casual observer.

In the construction shown in Figs. 1 and 2, which is for a Ford automobile, four of the ten leaves of the ordinary front spring 81, are removed and are replaced by the metal spacer 12, which is provided with the risers 13 at each end, to bring the frame to the standard height above the axle after the removal of the four leaves as stated, and the consequent lowering and weakening of the spring 81.

The spacer 12 thus forms a replacement spring seat for the frame spring 81, whose spring contacting surface can be varied to change the camber of the spring and to lower or raise the frame as desired by change of the height of the risers 13 and consequent change of the curve to which the center of the spring is forced by the U-bolts.

The four removed leaves, with three additional leaves similar to three which were retained in the front spring 81, go to make up the torque spring 3, in this particular make of car.

This construction not only insures the two springs with their respective loads having almost identical action over the obstacles and inequalities of the road, but also permits the use of the standard shackles, so that the only parts not standard, which must be provided for the front mounting in a car of this make, are the shackle brackets, bolts, nuts, set-screws and lock-nuts if used, and the spring seat and spacer.

For the particular make of car for which the form shown in Figs. 1 and 2 is adapted, the standard engine mounting bolts 36 are employed to attach the spring seat 1 to the engine.

It has been found that by the selection of the proper relative number of leaves for the frame and torque springs, by providing the proper spring contact surface on the spacer 12, by providing the proper spring contact surface on the engine spring seat, by providing the proper camber for the torque spring, and by providing a shackle bracket construction or position to locate the outer ends of the shackles to give them the proper inward angle, the movements of the frame and of the engine may be so closely harmonized, even though the frame spring action is controlled by hydraulic shock-absorbers, that there is no contact between the spring-seat and the front cross-member of the frame or parts mounted thereon under the roughest possible road conditions if a clearance of seven-eighths of an inch is normally provided between them.

The spring-seat 1 has the safety lugs 91, which normally clear the upper surface of the front frame cross-member 84 by about seven-eighths of an inch. These lugs never touch the cross-member 84 if the springs are properly harmonized, but serve to support the engine on the cross-member in case of breakage or wreck such as would otherwise allow the engine to drop.

The front frame cross-member 84 is cut along the line C—C to provide clearance in such a case for the fan belt pulley, while still not permitting the downward passage thereby of the lugs 91.

Figure 3:
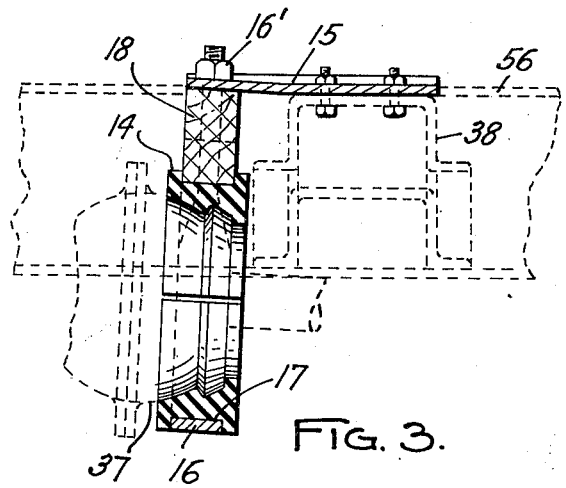
Fig. 3 is a fragmentary section of one form of the rear mounting construction, with some of the co-acting parts of the vehicle shown in dotted lines.
Figure 5:
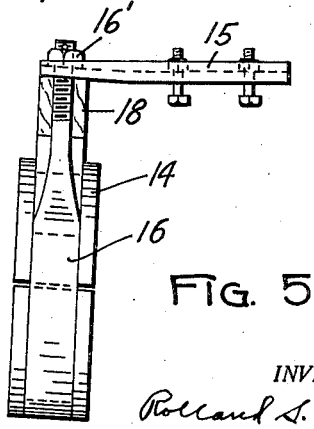
Fig. 5 is a side elevation of Fig. 3 without the coacting parts of the vehicle.
Figure 4:
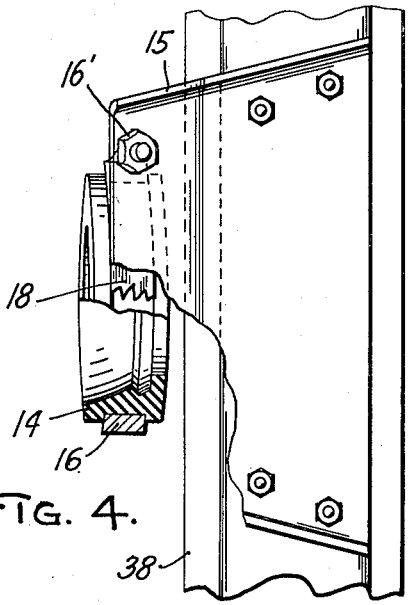
Fig. 4 is a top plan view and partial section of the rear mounting shown in Fig. 3, and showing a part of the coacting cross-member of the frame.

In the form of rear mounting shown in Figs. 3, 4 and 5, and which specific construction is claimed in a companion application, Serial No. 599,249, filed March 10, 1932, the rubber ring 14, preferably composed of two substantially half-circular pieces, is moulded to fit the outer contour of an external part at the rear of the transmission case, such as the universal joint housing 37, shown by dotted lines in Fig. 3. If desired, the outer contour of the ring 14 may be made slightly elliptical with the long axis horizontal. The effect of this is to prevent relative movement of the rubber and the support while the molding of the rubber to fit the housing 37 causes a gripping of the latter sufficient to reduce the free pivotal action provided by the mounting sufficient to take torque at slow engine speeds, and takes a decreased amount of torque at higher speeds when the amount of oscillation decreases. So the net result is that the ring reduces the free movement of the engine.

The support member 15 is properly attached to the cross-member 38 of the frame, and the strap member 16 fits in the groove 17 of the rubber ring 14 and is supported by the support member 15 by the nuts 16'.

When the nuts 16' are tightened, the rubber of the ring 14 is compressed on the housing 37, and this may be carried to the point where the ring 14 securely grips the housing, thereby transmitting more and more torque reaction through the rubber, thereby decreasing the amount of the oscillation and making the engine steadier. The compression of the rubber ring 14 should be such as to make the engine unit the most steady possible without vibration being transmitted through the rubber, and this compression can be increased with decreased oscillation but should not go to the point where it begins to transmit noticeable vibration to the frame.

The support member 15 is provided with a spacer member 18, which may be made integral with the member 15 or separate as shown, and this member 18 fits in the groove 17 of the ring 14, which construction assists in holding the spacer member 18 in place.

The spacer member 18 may be made of wood as shown or of any other proper material or construction so long as it acts to position the ring 14 with respect to the support member 15.

The depth of the spacer member 18 is proportioned so that when the rear of the power plant is at the desired height, the strap member 16 pulls the rubber ring up against the spacer member 18, the required compression of the rubber being provided by the proper depth of the spacer member 18.

Thus the rear of the power plant is properly supported and positioned and the resilience of the rubber ring 14 permits the necessary slight pivotal movements of the power plant with respect to the frame due to the give of the torque spring 3 and the flow of the rubber ring 14 in cushioning the engine torque reaction.

The properly harmonized action of the frame spring 81 and of the torque spring 3, will eliminate substantially all vertical movement of the front of the engine with respect to the frame, as stated above, so that the rubber ring 14 will be forced to give little on account of such relative vertical movement of the front of the engine. But, should any such movement take place, the rubber ring 14 will permit it without harm to any of the construction.

Figure 8:
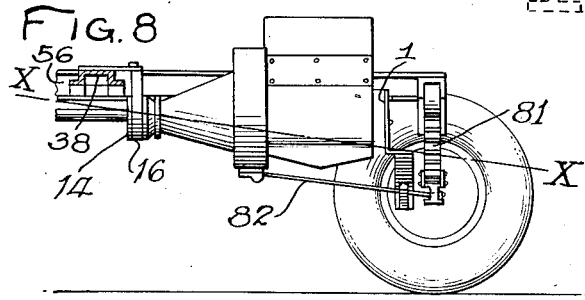
Fig. 8 is a longitudinal side elevation partly in section showing the front and rear engine mountings and indicating the location of the axis of oscillation.

The mounting of the engine unit composed of an engine and its flywheel and a transmission on the torque spring 3 at the front and on the rubber ring 14 at the rear, so that the flywheel and the bulk of the engine unit are between these two points of support, allows the engine unit to oscillate about a longitudinal oblique axis designated X—X in Fig. 8 due to the impulses incident to the operation of the engine unit, while at the same time having a restrained freedom of movement in any direction, through an orbit in a closed path, which is greater at the front than at the rear. The spring 3 and its shackles 6 allow such movement at the front, while the mounting 14 permits such movement at the rear, and both mountings restrain freedom of movement. I have found from the use of the mountings set forth in this application that when the engine is running at normal or high speeds, it will oscillate about a longitudinal axis that extends forward from the rear mounting longitudinally of the engine unit. Actual tests have shown that at low speeds when the engine is pulling, the engine unit oscillates about an axis extending approximately through the top leaf of the engine spring, as shown at X—X in Fig. 8. The character and location of the rear mounting keeps the axis at the rear approximately at the crank-shaft axis.

In the rear mounting construction shown in Figs. 3, 4 and 5, the engine unit, whether it includes the transmission and universal joint construction or not, is mounted upon the frame by a rubber ring which permits substantially universal pivotal movement between the engine unit and the frame at that point.

In either case, it will be observed that by proper moulding of the rubber ring, and by proper construction of the support member, the rear mounting may be adapted to any make or design of automotive vehicle, whether the engine is in a unit power plant construction or is separate from the transmission.

In the same way, by the proper design and construction of the torque spring seat, the torque spring and its connection with the front axle, the front mounting may be designed and constructed to be mounted upon and to operate properly with any make or design of automotive vehicle.

One well-known form of construction for the control of the throttle and of the spark of an automotive vehicle is provided by two ball-ended levers connected by a rod having spring-held ball-fitting sockets at the ends.

Figure 9:
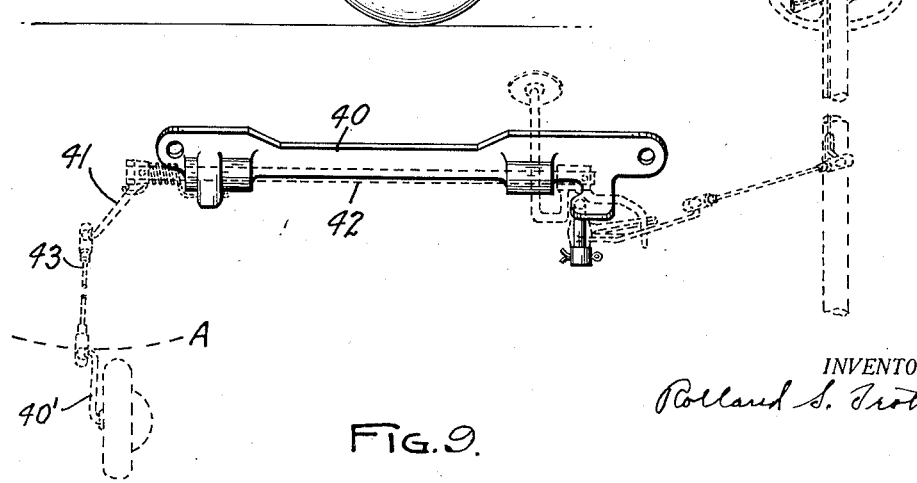
Fig. 9 shows diagrammatically, the parts of one form of throttle control construction.

Fig. 9 shows in solid lines the accessory replacement member 40 for mounting the accelerator shaft and hand-throttle bell-crank on the body, dash, or foot-boards of the Ford car mentioned above. The ball-ended lever 41 secured upon the accelerator shaft 42 does not move with the engine in its torque cushioning actions. The ball-ended lever 40' on the carburetor, moves with the engine in its torque cushioning movements, which are substantially transverse. The rod 43 is provided with ball-fitting sockets which are mounted upon the balls of the arms 41 and 40'.

Since the rod 43 extends practically at right-angles to the torque cushioning engine movements, the carburetor end of the rod 43 describes an arc "A", whose center is the center of the ball on the arm 41. Thus there is substantially no change in the setting of the carburetor throttle due to the engine torque cushioning movements.

Any other proper method or construction for the throttle control may be employed so long as the results are satisfactory and reliable.

In Fig. 10 is shown a construction which does the same for the spark control as is done for the throttle control by the construction shown in Fig. 9. The base 48 is to be properly mounted upon the body, dash, or foot-boards, and pivotally mounts the bell-crank 46. The ball-ended distributor lever 45 is connected to the ball-ended lever 47 of the bell-crank 46 by the forwardly extending rod 44, which is provided with ball-fitting sockets at its ends. The action is substantially the same as described for Fig. 9, the result being a spark control which is practically unaffected by the torque cushioning engine movements or by any other relative movements between the frame and the engine unit.

Any other proper method or construction for the control of the spark may be employed so long as the results are satisfactory and reliable.

In Fig. 11 is shown the pedal control construction which may be employed if desired, to reduce or eliminate movement of the pedals due to relative movement between the frame and the engine unit. The clutch pedal is cut off as at 51, forming the clutch lever 50, which is provided with the hole 52 for the reception of one end of the spring 53, and has securely attached to it the ball-member 54.

The pedal support shaft 55 is properly mounted upon the side frame members 56, and carries the pivotally mounted pedal 57, which has the hole 58 for the reception of the other end of the spring 53, and has stop-arm 59, and is provided with the hole 60 for the reception of an end of spring 61. The other end of the spring 61 is received by the hole 62 in the arm 63 of the shaft 55. The spring 61 holds the pedal 57 back in place with the stop arm 59 against the shaft 55. The pedal 57 is provided also with ball 65, and a rod 64 has socketed ends which fit the balls 54 and 65, the engagement being maintained by the spring 53.

The brake pedal may be mounted upon the shaft 55, and properly connected in the usual manner, or the clutch pedal 57 may also be used as the brake pedal if desired by connecting thereto the brake connection as at 66.

In any case it will be seen that the radial movement of the rod 64 will practically eliminate any movement of the clutch pedal 57 due to relative movement between the frame and the engine unit.

Any other proper method or construction whereby this result is obtained may be employed if desired, so long as the result is satisfactory and reliable.

In Fig. 12 is shown one method of transmission control whereby the relative movement of engine unit and frame will not affect the operation or setting of the transmission. The cross-member 70 is properly secured to the frame 71 and carries the shift lever housing 72, in which is mounted the shift lever 73. The housing 72 carries the selector rods 74 (only one of which is shown), which are provided with the balls 75.

The shifter rods 76 (only one of which is shown) extend from the transmission 77 and are provided with the balls 78. The rods 79 are provided with ball-fitting sockets at the ends which engage the balls 75 and 78.

This construction permits relative transverse movement between the engine unit and the frame without affecting the operation or the setting of the transmission. Any other proper method or construction whereby the same general ends may be obtained may be employed so long as the results are satisfactory and reliable.

Having now described my invention, what I claim as new, and desire to protect by Letters Patent, is as follows:

1. In an automotive vehicle having a frame, a front axle, and a spring mounting construction supporting the frame on the front axle, an engine unit, a mounting for the engine unit comprising a spring construction carried by a bracket on the engine unit and supported by the front axle at two points, and a rubber mounting at the rear of the engine unit and in engagement with an external part thereof, and means supporting the rubber mounting upon the frame.

2. In an automotive vehicle having a frame, a front axle, and a spring mounting construction supporting the frame on the front axle, an engine unit, a mounting for the engine unit comprising a spring seat carried by the engine unit, a spring mounting construction attached to the spring seat and secured to and supported by the front axle at two points, and a rubber member having an outer surface elongated horizontally carried by an external part adjacent the rear of the engine unit, and means supporting the rear of the engine unit through said rubber member upon the frame.

3. In an automotive vehicle having a frame, a front axle, and a spring mounting construction supporting the frame on the front axle, an engine unit, a mounting for the engine unit comprising a spring construction carried by a bracket on the engine unit and by the front axle independent of the frame, and resilient means supporting the rear of the engine unit upon the frame and permitting substantially universal movement.

4. In an automotive vehicle having a frame, a front axle, and a spring mounting construction supporting the frame on the front axle, an engine unit, a mounting for the engine unit comprising a spring seat carried by the engine unit, a spring attached to the spring seat, means mounting the spring on the front axle and permitting its deflection, and means including a rubber mounting member supporting the rear of the engine unit upon the frame and permitting substantially universal movement.

5. In an automotive vehicle having a frame, a front axle, and a spring mounting construction mounting the frame on the front axle, an engine unit, a mounting for the engine unit comprising a single spring attached to a bracket supporting the front of the engine unit and supported upon the front axle independent of the frame, said spring constructions being proportioned to the loads they carry to provide substantially equal deflections in service, and resilient means mounting the rear of the engine unit upon the frame and permitting substantially universal movement.

6. In an automotive vehicle having a frame, a front axle, and a spring mounting construction mounting the frame on the front axle, an engine unit, a mounting for the engine unit comprising a spring construction mounting the front of the engine unit on the front axle and including a bracket on the engine unit attached to the center of the spring, and brackets carried by the front axle and supporting the ends of the spring, and means mounting the rear of the engine unit on the frame.

7. In an automotive vehicle having a frame, a front axle, and a spring mounting construction mounting the frame on the front axle independent of the engine unit, an engine unit, a mounting for the engine unit comprising a spring carried by the front of the engine unit transversely thereof, and shackles mounting the spring ends on the front axle, the engine unit being off-center on the spring an amount substantially equal to the off-center swing of the spring on its shackles under the action of the engine torque, and opposite in direction, whereby the engine unit will be central with the frame when the said spring is off-center as stated, and means mounting the rear of the engine unit on the frame and permitting substantially universal movement.

8. In an automotive vehicle having a frame with a front cross-member, a front axle, and a spring mounting construction mounting the frame on the front axle, an engine unit having a fan belt pulley and a spring-seat, a spring attached to the spring-seat and supporting the front of the engine unit, and carried by the front axle, the said front cross-member of the frame being formed to clear the spring seat and the said pulley, and means mounting the rear of the engine unit on the frame and permitting substantially universal movement.

9. In an automotive vehicle having a frame with a front cross-member, a front axle, and a spring mounting construction mounting the frame on the front axle, an engine unit, a spring seat carried by the front of the engine unit and having a portion extending forward under and spaced from said frame cross-member, and having portions extending forward above and spaced from said frame cross-member, a spring secured to said spring seat and carried by the front axle, and means mounting the rear of the engine unit and permitting substantially universal movement.

10. An automotive vehicle engine unit mounting for a vehicle having a frame and an engine unit, comprising a rubber mounting carried by the frame permitting substantially universal movement, and a mounting carried at two points upon the front axle of the vehicle upon which the front of the engine unit is directly mounted, said mountings combining to resiliently support the engine unit and to resiliently oppose oscillation thereof.

11. In an automotive vehicle having a front axle, a frame, and an engine unit, each separately and resiliently and directly mounted upon the front axle adjacent their front ends, and a mounting for the rear of the engine unit directly upon the frame containing a rubber construction insulating the engine unit from the frame and permitting substantially universal movement and resiliently opposing oscillation thereof.

12. In an automotive vehicle having a frame, a front axle, and a spring mounting construction supporting the frame on the front axle, an engine unit, a mounting for the engine unit comprising a spring seat carried by the engine unit, a spring attached to the spring seat, means mounting the spring on the front axle and permitting its deflection, a universal joint housing carried by the rear of the engine unit, and means including a rubber member moulded to fit the exterior surface of said housing supporting the rear of the engine unit on the frame and permitting substantially universal movement.

13. In an automotive vehicle having a frame, a front axle, and a spring mounting construction supporting the frame on the front axle, an engine unit, a mounting for the engine unit comprising a spring seat carried by the engine unit, a spring mounting construction attached to the spring-seat and secured to and supported by the front axle at two points, a non-metallic member carried by an external part adjacent the rear of the engine unit, and means clamped around said non-metallic member supporting the rear of the engine unit through said non-metallic member upon the frame.

14. In an automotive vehicle having a frame, a front axle, and a spring mounting construction supporting the frame on the front axle, an engine unit, a mounting for the engine unit comprising a spring seat carried by the engine unit, a spring attached to the spring-seat, means mounting the spring on the front axle and permitting its deflection, a mounting member carried by the rear portion of the engine unit and having a peripheral rounded portion, a non-metallic member molded to fit and engaging said rounded portion of the mounting member, and means carried by the frame engaging said non-metallic member and forming with the mounting member and the non-metallic member a substantially universal mounting for the rear end of the engine unit upon the frame.

15. The combination in a motor vehicle, of an engine unit including an engine portion and a transmission portion which has a tendency to torque cushioning oscillatory movements about a longitudinal axis during operation, longitudinally spaced resilient mounting structures on the vehicle and supporting the engine unit, one of said mounting structures being of approximately arcuate configuration and supporting the transmission portion with the center of said arcuate configuration approximately concentric with the axis of the crank-shaft of the engine and with the longitudinal axis of oscillation of the engine unit and yieldingly opposing said oscillatory movement, the other mounting structure being associated with the engine portion and approximately symmetrical with respect to the longitudinal central vertical plane of the engine unit and cooperating with the first-mentioned mounting structure to resiliently limit said oscillatory movements of the engine unit.

16. The combination in a motor vehicle, of an engine unit mounted for torque cushioning oscillation about a longitudinal axis, and having a unitary engine casing enclosing a flywheel and having a projection thereon, longitudinally spaced resilient mounting structures carried by the vehicle and supporting the engine unit, one of said mounting structures being arranged to engage said projection and also to permit a degree of bodily movement in approximately all directions transversely of the vehicle, said mounting structures being approximately symmetrical with respect to the longitudinal central vertical plane of the engine unit and permitting movement of the engine unit with respect to the vehicle under impulses incident to the operation of the engine, the other of said mounting structures having portions thereof arranged approximately on an arc with the center of said arc approximately on the axis of oscillation, said last-mentioned mounting structure yieldingly opposing engine actuated torque cushioning oscillation of the engine unit and supporting the rear portion of the engine unit by direct engagement with the unitary casing in a manner to provide limited universal movement and spaced from the rear of the flywheel of the engine, whereby to have the advantage of the gyroscopic action of the flywheel for reducing the engine vibration transmitted to the rear mounting, the combined action of said mountings acting to resiliently limit the torque cushioning oscillation.

17. In an automotive vehicle, the combination with an engine unit having an engine portion and a transmission portion, of a single mounting structure, supported on the vehicle, for each of said portions of the engine unit and upon which the portions of the engine unit are carried, the points of connections between said mounting structures and the engine unit being disposed approximately symmetrical with respect to the longitudinal vertical plane of the engine unit, said structures mounting said engine unit so as to permit torque cushioning oscillation thereof about a longitudinal axis and both of them providing yielding opposition to such oscillation, said mounting structure at the cylinder end of the engine unit being so constructed and arranged as to permit orbital movement in a closed path of said axis of oscillation at least at that end in response to impulses incident to the operation of the engine unit.

18. In an automotive vehicle having a frame, a front axle, a spring mounting construction supporting the frame on the front axle, an engine unit, a mounting for the engine unit comprising a spring construction carried by a bracket on the engine unit and supported by the front axle at two points, and a rubber mounting at the rear of the engine unit and in engagement with an external part thereof, and means supporting the rubber mounting upon the frame, said spring and rubber mounting constructions acting jointly to resiliently support and resiliently oppose oscillation of the engine unit.

19. In an automotive vehicle having a frame, a front axle, and a spring mounting construction supporting the frame on the front axle, an engine unit, a mounting for the engine unit comprising a spring construction carried by a bracket on the engine unit and by the front axle independent of the frame, and resilient means supporting the rear of the engine unit on the vehicle and permitting substantially universal movement, said spring construction and said resilient means combining to resiliently support and resiliently oppose oscillation of said engine unit.

20. In an automotive vehicle having a frame, a front axle, a transverse spring mounting the frame on the front axle, an engine unit, a mounting for the engine unit comprising a transverse spring attached to the front of the engine unit independent of the frame and secured to and supported by the front axle, and resilient means mounting the rear of the engine unit upon the frame, said spring and resilient means acting jointly to resiliently support and resiliently oppose oscillation of said engine unit.

21. In an automotive vehicle having a frame, a front axle, and a spring mounting construction mounting the frame on the front axle, an engine unit, a mounting for the engine unit comprising a single spring attached to a bracket supporting the front of the engine unit and supported upon the front axle independent of the frame, said spring constructions being proportioned to the loads they each carry to provide substantially equal deflections in service, and resilient means mounting the rear of the engine unit upon the frame and permitting substantially universal movement, said spring and resilient means cooperating to resiliently support and to resiliently oppose oscillation of said engine unit.

22. In an automotive vehicle having a frame, a front axle, and a spring mounting construction mounting the frame on the front axle independent of the engine unit, an engine unit, a mounting for the engine unit comprising a spring mounting construction mounting the front of the engine unit direct on the front axle independent of the frame, and resilient means mounting the rear of the engine unit on the frame and permitting substantially universal movement, said spring mounting construction and said resilient means cooperating to resiliently mount and resiliently oppose oscillation of said engine unit.

23. In an automotive vehicle engine unit mounting, an engine unit, a mounting for the engine unit comprising a single point resilient mounting direct on the frame of the vehicle, and a two-point resilient mounting upon the front axle of the vehicle, the front of the engine unit being directly spring-supported upon the last named two points, said resilient mountings combining to support and oppose the oscillation of the engine unit.

24. In an automotive vehicle engine unit mounting, an engine unit, a mounting for the engine unit comprising a single point resilient mounting direct on the frame permitting substantially universal movement, and a two-point resilient mounting upon the front axle of the vehicle upon which the front of the engine unit is directly and resiliently mounted, said resilient mountings combining to oppose oscillation of the engine unit.

25. In an automotive vehicle engine unit mounting for a vehicle having an engine unit, and composed of a rubber mounting permitting substantially universal movement supported upon the frame and supporting a portion of the engine unit and a mounting supported upon the front axle of the vehicle and upon which the front of the engine unit is directly mounted, said mountings combining to resiliently support and resiliently oppose oscillation of the engine unit.

26. In an automotive vehicle engine unit mounting, a front axle, a frame and an engine unit each separately and resiliently and directly mounted upon the front axle adjacent their front ends, and a resilient direct connection between the rear portion of the engine unit and the frame permitting substantially universal movement, the mounting of the engine unit on the front axle and said resilient connection combining to resiliently support and resiliently oppose oscillation of the engine unit.

27. In an automotive vehicle having a frame, a front axle, and a spring mounting construction supporting the frame on the front axle, an engine unit, a mounting for the engine unit comprising a spring seat carried by the engine unit, a spring mounting construction attached to the spring seat and secured to and supported by the front axle at two points, and a non-metallic member carried by an external part adjacent the rear of the engine unit, and means clampable upon said non-metallic member supporting the rear of the engine unit through said non-metallic member upon the frame, said spring mounting construction and said non-metallic member acting to support and resiliently oppose the oscillation of said engine unit.

28. In an automotive vehicle having a frame, a front axle, and a spring mounting construction supporting the frame on the front axle, an engine unit, a mounting for the engine unit comprising a spring seat carried by the engine unit, a spring attached to the spring seat, means mounting the spring on the front axle and permitting its deflection, a mounting member carried by the rear portion of the engine unit, a nonmetallic member engaging said mounting member, and means carried by the frame engaging said non-metallic member and forming with the mounting member and the non-metallic member a substantially universal mounting for the rear end portion of the engine unit upon the frame, said spring and said universal mounting combining to jointly support the engine unit and to jointly and resiliently oppose its oscillation.

29. The combination in a motor vehicle, of an engine unit having an engine end portion and a transmission end portion mounted thereon to have torque cushioning oscillation about a longitudinal axis, each end portion of said engine unit having a single resilient mounting supported on the vehicle, at least one of said mountings being metallic and arranged to permit limited transverse movement of an end portion of the engine unit and to yieldingly oppose the torque cushioning rolling tendency of the engine unit due to the torque impulses of the running engine unit about a longitudinal axis, the other of said mountings combining with the first mounting to resiliently limit said torque cushioning oscillation, said axis adjacent at least one of said mountings being approximately coincident with the axis of the shaft of the engine unit.

30. The combination in a motor vehicle, of an engine unit having a flywheel mounted thereon and having torque cushioning oscillation about a longitudinal axis, two resilient mounting structures supported on the vehicle on which the engine unit rests and forming on opposite sides of said flywheel supporting means for the engine unit, one mounting structure rearwardly of the flywheel being non-metallic and arranged approximately on a transversely extending arc with its center above at least a portion of said mounting structure and constructed and arranged to yieldingly oppose the torque cushioning rolling motion of the engine unit on the mountings due to the influence incident to the operation of the engine unit, the other mounting structure combining with the first mounting structure to resiliently limit said oscillation.

31. The combination in a motor vehicle, of an engine unit having a flywheel, two spaced resilient mountings supported by the vehicle on opposite sides of said flywheel and carrying the engine unit for torque cushioning oscillation, one mounting being so constructed and arranged as to permit orbital movement of an end of the engine unit, the other mounting rearwardly of the flywheel being non-metallic and accommodating itself to the requirements of the orbital movement of the first-mentioned mounting and yieldingly opposing torque-imposed oscillation of the engine unit, said last-mentioned mounting being arranged on a transversely extending arc, the center of which is above at least a portion of the mounting, the joint action of the two mountings cushioning the torque cushioning movements due to torque impulses of the engine, and cooperating to limit such movements resiliently.

32. In an automotive vehicle, the combination of an engine unit having an engine portion and a transmission portion mounted thereon for torque cushioning oscillation about a longitudinal axis, resilient means mounting one of said portions of the engine unit on the vehicle and permitting approximately universal movement of said portion while holding said portion against substantial lateral movement and yieldingly opposing said oscillation, and resilient means mounting and supporting the other of said portions of the engine unit on the vehicle and constructed and arranged to permit orbital movement of the engine unit at least at that end in response to the impulses incident to the operation of the engine unit, said last resilient means cooperating with said first resilient means to resiliently limit the amplitude of said oscillation, and at least one of said resilient means being metallic.

33. In a vehicle, a mounting for multi-cylinder power unit to minimize tremor in the vehicle during operation, said power unit having engine cylinders and a transmission, a plurality of longitudinally spaced resilient supporting structures carried by the vehicle and on which the power unit is carried for yieldingly opposed torque-cushioning oscillation about a longitudinal axis, at least one of said supporting structures constructed and arranged to permit and limit engine actuated orbital movement of the cylinders about a fulcrum point remote from one end of the cylinders, and another of said supporting structures having supporting portions thereof arranged approximately on an arc extending transversely of the vehicle and the center of which arc is above at least a portion of the mounting to provide said fulcrum point relatively remote from one end of the cylinders and to yieldingly oppose the oscillation of the engine unit, said supporting structures co-operating to resiliently limit the amplitude of said oscillation.

34. In a mounting for a multi-cylinder engine unit on a vehicle to minimize tremor in the vehicle during operation, a plurality of spaced resilient supporting structures carried by the vehicle and on which the engine unit is carried for yieldingly opposed torque cushioning oscillation about a longitudinal axis, one of said supporting structures beng constructed and arranged to permit and limit engine-actuated orbital movement of the cylinders, and another of said supporting structures being remotely spaced from the corresponding end of the cylinders and having supporting portions thereof arranged approximately on an arc extending transversely of the vehicle and the center of which arc is above at least a portion of the mounting to yieldingly oppose said oscillation of the engine unit, said supporting structures combining to resiliently limit the amplitude of said oscillation.

35. The combination in a motor vehicle, with an engine unit having a flywheel, of front and rear resilient mounting structures on opposite sides of the flywheel supporting the engine unit and supported by the vehicle, each mounting structure acting individually to yieldingly oppose transverse movement of the engine unit in any direction, and both mounting structures acting together to resiliently limit the amplitude of oscillatory movements of the engine unit as a whole, at least one of said mounting structures being metallic.

36. The combination in a motor vehicle, of an engine unit, a front and a rear resilient mounting structure supported on the vehicle and forming supporting means for the engine unit, whereby the engine unit may have torque cushioning oscillation about a longitudinal axis, the rear mounting structure being non-metallic and arranged approximately on a transversely extending arc with the geometrical center of said arc approximately at the axis of the engine unit crankshaft, said rear mounting structure being constructed and arranged to yieldingly oppose the torque cushioning oscillation of the engine unit on the mounting structures due to the influence incident to the operation of the engine unit.

37. The combination in a motor vehicle, of an engine unit, a front and a rear resilient mounting structure supported on the vehicle and on which the engine unit rests, whereby the engine unit may have torque cushioning oscillation about a single longitudinal axis, the rear mounting structure being non-metallic and arranged approximately on a transversely extending arc with the geometrical center of said arc approximately at the axis of the engine unit crankshaft, said rear mounting structure being constructed and arranged to yieldingly oppose the torque cushioning oscillation of the engine unit on the mounting structures due to the influence incident to the operation of the engine unit, the front mounting structure combining with the rear mounting structure to resiliently limit said oscillation.

38. The combination in a motor vehicle, of an engine unit, a front and a rear mounting structure supported on the vehicle and forming supporting means for the engine unit, whereby the engine unit may have torque cushioning oscillation about a single longitudinal axis, the rear mounting structure being non-metallic having its portions arranged approximately on transversely extending arcs with the geometrical centers of said arcs approximately at the longitudinal axis which is substantially coincident with the axis of the engine unit crankshaft adjacent said rear mounting structure, said rear mounting structure being constructed and arranged to yieldingly oppose the torque cushioning oscillation of the engine unit on the mounting structures due to the influence incident to the operation of the engine unit.

39. The combination in a motor vehicle, of an engine unit, a front and a rear mounting structure supported on the vehicle and on which the engine unit rests, whereby the engine unit may have torque cushioning oscillation about a single longitudinal axis, the rear mounting structure being non-metallic and having its portions arranged approximately on transversely extending arcs with the geometrical centers of said arcs approximately at the longitudinal axis which is substantially coincident with the axis of the engine unit crankshaft adjacent said rear mounting structure, said rear mounting structure being constructed and arranged to yieldingly oppose the torque cushioning oscillation of the engine unit on the mounting structures due to the influence incident to the operation of the engine unit, the front mounting structure combining with the rear mounting structure to resiliently limit said oscillation.

40. The combination in a motor vehicle, of an internal combustion engine unit, a front resilient mounting structure and a rear resilient mounting structure, said front and rear resilient mounting structures being supported on the vehicle and forming supporting means for the engine unit, whereby the engine unit may have torque cushioning oscillation about a longitudinal axis, the rear mounting structure being non-metallic and being arranged approximately on a transversely extending arc with the geometrical center of said arc approximately at the axis of the engine unit crankshaft for locating the axis of oscillation approximately at the crankshaft axis adjacent the rear mounting structure, said rear mounting structure being so constructed and arranged to yieldingly oppose the torque cushioning oscillation of the engine unit on the mounting structure due to the influence incident to the operation of the engine unit, the front and rear mounting structures being constructed and arranged to locate the axis of oscillation so that said axis of oscillation extends throughout substantially the entire length of the engine unit approximately in the longitudinal central vertical plane thereof.

41. The combination in a motor vehicle, of an internal combustion engine unit, a front resilient mounting structure and a rear resilient mounting structure, said front and rear resilient mounting structures being supported on the vehicle and forming supporting means for the engine unit, whereby the engine unit may have torque cushioning oscillation about a longitudinal axis, the rear mounting structure being non-metallic and being arranged approximately on a transversely extending arc with the geometrical center of said arc approximately at the axis of the engine unit crankshaft for locating the axis of oscillation approximately at the crankshaft axis adjacent the rear mounting structure, said rear mounting structure being so constructed and arranged to yieldingly oppose the torque cushioning oscillation of the engine unit on the mounting structures due to the influence incident to the operation of the engine unit, the front mounting structure combining with the rear mounting structure to resiliently limit said oscillation and being constructed and arranged to locate the axis of oscillation so that said axis of oscillation extends throughout substantially the entire length of the engine unit approximately in the longitudinal central vertical plane thereof.

ROLLAND S. TROTT.